UNITED STATES PATENT OFFICE.

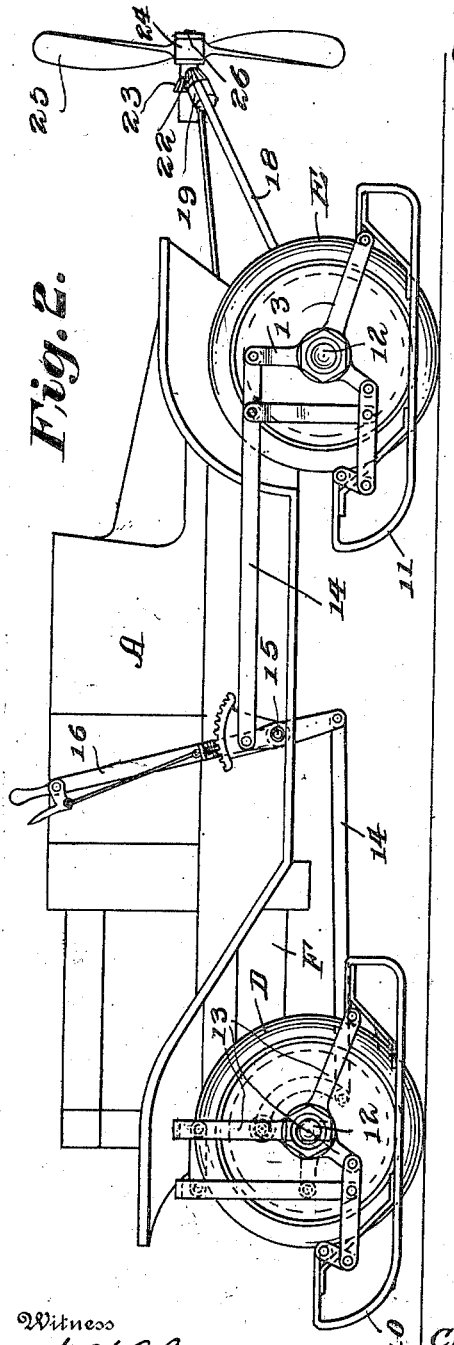
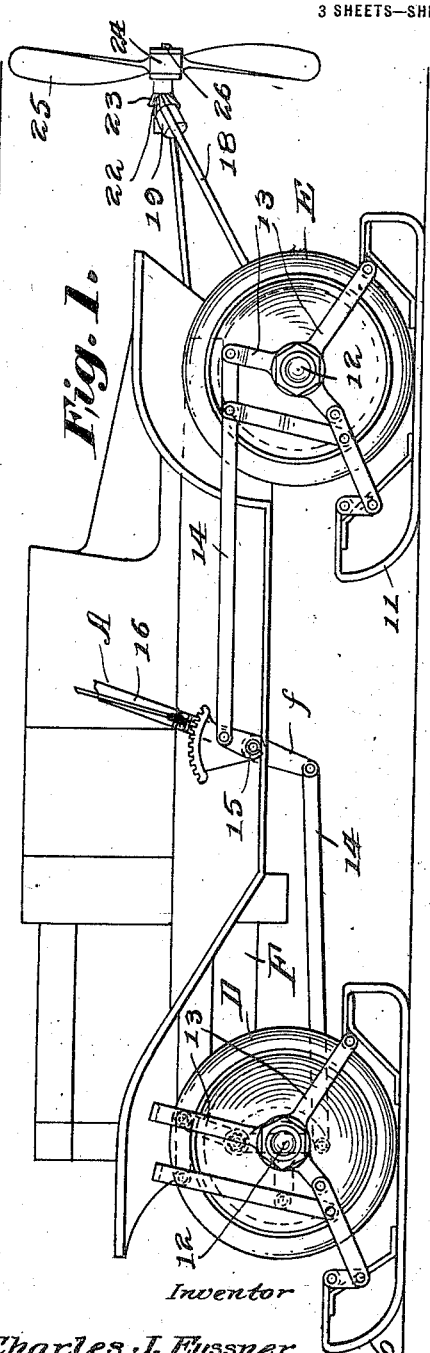

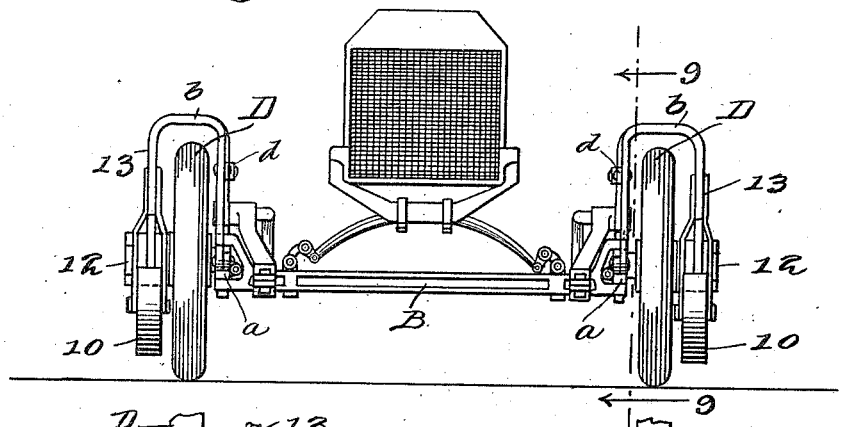
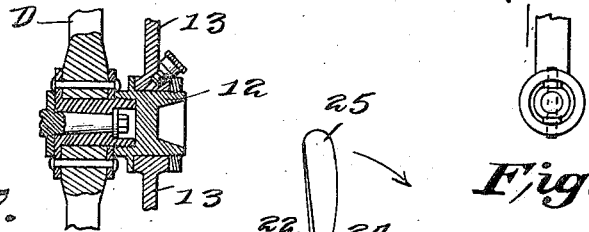
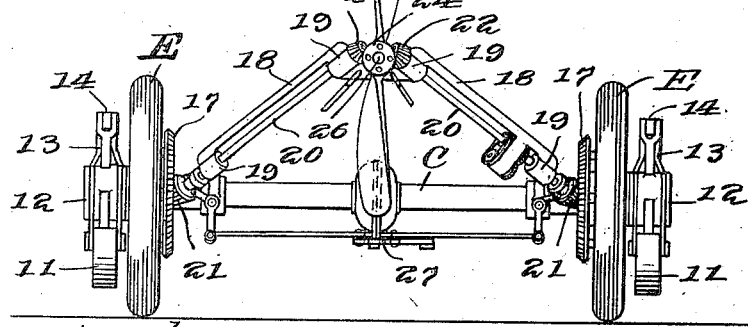
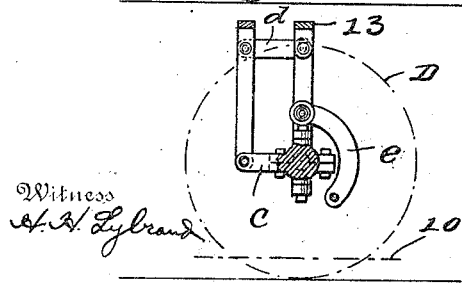

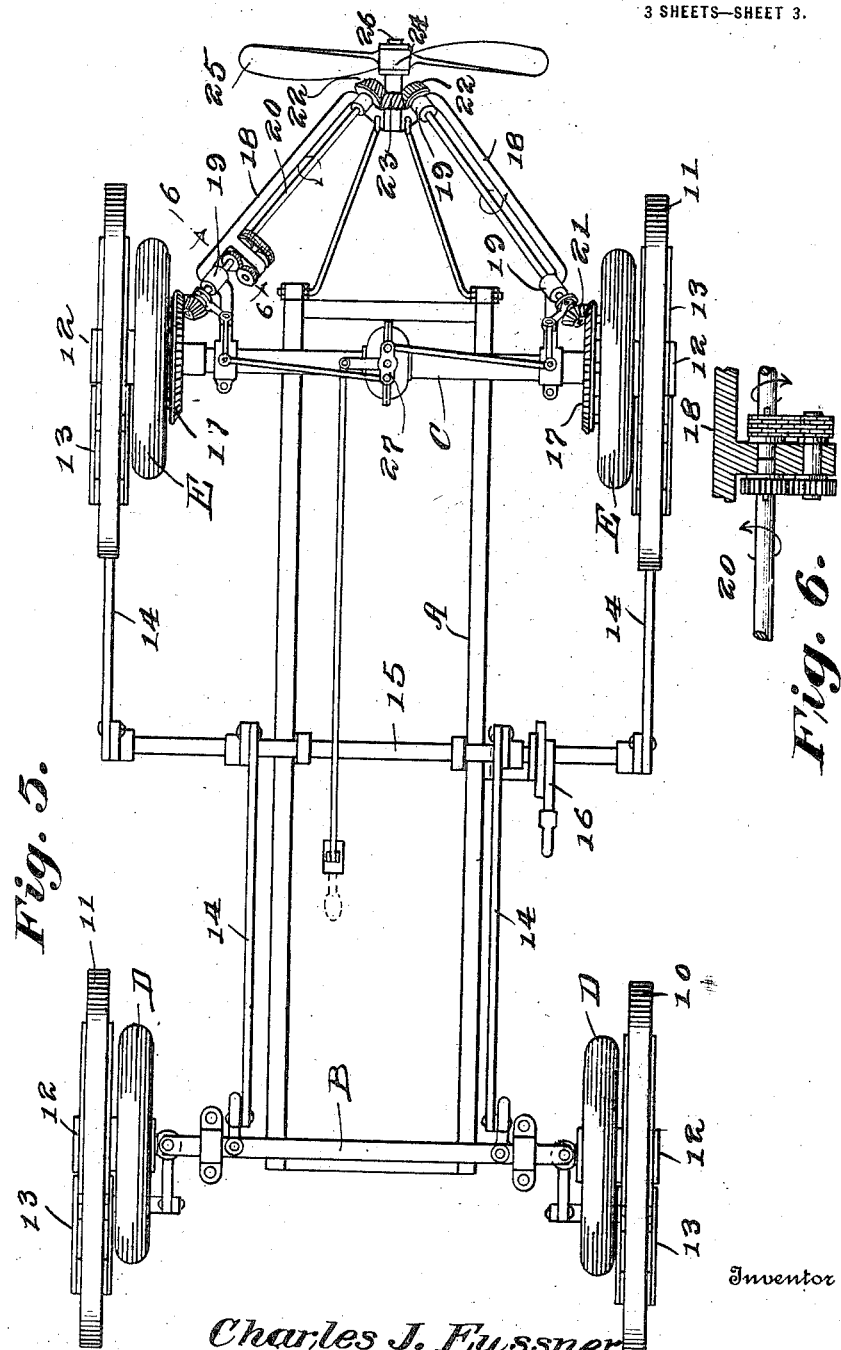

CHARLES J. FUSSNER, OF BRIMFIELD, ILLINOIS.

SLEIGH ATTACHMENT.

1,229,058.  Specification of Letters Patent.  Patented June 5, 1917.

Application filed August 9, 1916. Serial No. 114,051.

*To all whom it may concern:*

Be it known that I, CHARLES J. FUSSNER, a citizen of the United States, residing at Brimfield, in the county of Peoria and State of Illinois, have invented new and useful Improvements in Sleigh Attachments, of which the following is a specification.

The invention relates to a sleigh attachment, and more particularly to the class of motor car sleigh attachments.

The primary object of the invention is the provision of an attachment of this character wherein it can be used upon the ordinary automobile to thus convert the same into an automobile sleigh without making it necessary to remove the wheels thereof.

Another object of the invention is the provision of an attachment of this character wherein the operator can, at his option, convert the automobile for travel either upon snow or ice or upon uncovered ground and when traveling upon snow or ice the wheels of the automobile will be elevated above the same, yet the power from the motor within the automobile will be utilized for driving the same as a sleigh.

A further object of the invention is the provision of an attachment of this character wherein the construction thereof is novel in form so that it can be readily applied to any style of automobile without the removal of the wheels therefrom, although said wheels can be dispensed with should it be desired. The attachment, when applied, does not require any change or alteration in the construction of the automobile and the same will be driven in the usual manner when used in its ordinary capacity or as a sled.

A still further object of the invention is the provision of an attachment of this character which is simple in construction, thoroughly reliable and efficient in its operation, strong, durable, readily and easily applied to and removed from an automobile, and inexpensive in manufacture and installation.

Other objects will be in part obvious and in part hereinafter set forth.

The invention accordingly consists in the features of construction, combination of elements and arrangement of parts which will be exemplified in the construction hereinafter described, and the scope of the application of which will be indicated in the appended claims.

In the accompanying drawings:

Figure 1 is a side elevation of an automobile showing the attachment constructed in accordance with the invention ready for use;

Fig. 2 is a similar view, with the attachment in position for disuse;

Fig. 3 is a fragmentary vertical longitudinal sectional view taken at the point of one of the front wheel turning knuckles;

Fig. 4 is a front elevation;

Fig. 5 is a bottom plan view;

Fig. 6 is a sectional view on the line 6—6 of Fig. 5;

Fig. 7 is a fragmentary sectional view through one of the hubs of the rear wheels;

Fig. 8 is a detail view of one of the knuckle joints for the front steering wheels;

Fig. 9 is a sectional view on the line 9—9 of Fig. 4.

Similar reference characters indicate corresponding parts throughout the several views of the drawings.

Referring to the drawings in detail, A designates generally the body of an automobile which may be of any approved form; B, the front axle; C, the rear stationary axle, while on the front axle are the turning knuckles *a*. The latter, together with the rear stationary axle C are provided with suitable wheel spindles on which are arranged the front and rear wheels D and E respectively, it being understood, of course, that the automobile in its entirety is of the ordinary well known construction and the rear wheels are driven from a motor F through the transmission mechanism as usual, while the front wheels are steered in the ordinary well known manner for the guiding of the automobile when operated.

The automobile shown and described serves merely to illustrate the application and the mode of operation of the sled attachment hereinafter fully described.

The sled attachment comprises front and rear runners 10 and 11, respectively, which are similarly constructed and are adapted for travel upon the ice and snow. Each runner 10 and 11 has suitable bearing 12 for supporting the coöperating levers 13 of suitable lifting jacks which are connected to the spindles of the front and rear axles and are capable of manual adjustment. Each front lifting jack has connected therewith the pairs of inverted substantially U-shaped yokes $b$, one of each pair being pivoted to an extension $c$ on each knuckle joint $a$, while the other is swingingly supported at the pivot point of said knuckle, and at these pivot points are connected through the medium of a suitable ball and socket joint the arcuate shaped arms $e$, while the yokes of each pair are pivotally connected together through the medium of the links $d$, and connected to the arms $e$ and to the rear lifting jack are actuating rods 14 which are also pivoted to cranks $f$ of a shaft 15 common thereto and suitably mounted in the frame of the automobile. The shaft 15 is operated by a hand released throw lever 16 disposed in convenient reach of the operator of the automobile so that the jack can be simultaneously moved for the raising or lowering of the wheels D and E and likewise the runners 10 and 11 so that alternately the same may be brought into active or inactive position relative to the surface over which the automobile is to travel.

Detachably bolted to the rear wheels are beveled gears 17 which are located on the inner sides thereof concentrically of the hubs of the said wheel fixed to the stationary axle C, and rising therefrom is a supporting frame 18 having therein bearings 19 in which are journaled driven shafts 20, having connection through the medium of pinions 21 with the gears 17, the pinions being adapted for slidable movement to throw the same into and out of meshing engagement with said gears, and these shafts also have connection with gears 22 for meshing engagement with a pinion 23 fixed to the stud shaft 26 of a bladed propeller wheel 25, the stud shaft 26 being journaled in a bearing 24 formed in said frame, and this propeller wheel 25 is located or spaced rearwardly from the frame and is designed to drive the sleigh attachment when the automobile is converted into a sleigh.

It will be obvious that motion from the rear wheels D will be transferred therefrom to the propeller shaft 26 for the driving thereof when the pinions 21 are meshing with the gears 17 on said wheel. The pinions 21 are thrown into and out of engagement with the gears 17 through the medium of a shifting mechanism 27 which is hand operable and extends to a point convenient to the operator of the automobile so that the pinions 21 can be thrown out of mesh with the gears 17 or into mesh therewith, thereby rendering the propeller wheel inactive or active, the propeller wheel being inactive when the automobile is used in the ordinary manner and the runners are elevated from the surface over which the wheels of the automobile travel.

By reason of the size of gears and pinions it will be noted that the same serve as a multiplying gearing for the propeller wheel 25 so that the same will rotate at the proper speed for assuring the advancement of the automobile when converted into a sleigh. The motor of the automobile is stopped and started and the speed controlled in the ordinary well known manner.

In the operation of the attachment, when the lever 16 is thrown in one direction the wheels D and E of the automobile will be raised from the ground surface and the runners held in contact therewith so that in event that the ground surface is covered with ice or snow on the starting of the propeller wheel 25 the automobile will be driven forwardly and in this manner said automobile will be advanced for the use thereof as a sleigh.

Now on reverse movement of the lever 15 the wheels D and E will be lowered to the ground and the runners 10 and 11 elevated therefrom so that the automobile can be used in the ordinary, well known manner, as will be obvious.

It is of course to be understood that the disclosure in the drawings and the foregoing description illustrate and delineate but a concrete form of the invention, it being contemplated to change, vary or alter the construction of the invention in any and all of its details as may come properly within the scope of the appended claims without departing from the spirit of the invention or sacrificing any features or advantages.

From the foregoing description, taken in connection with the accompanying drawings, the construction and operation of the herein described sleigh attachment will be apparent and, therefore, a more extended explanation has been omitted.

Having thus described my invention, I claim:

1. The combination with a motor vehicle, of front and rear wheel runners, lifting jacks pivotally mounted on the axles of the vehicle, an operating member, connections between the operating member and the lifting jacks, said connections extending outwardly beyond the rear wheels of the vehicle and inwardly of the front wheels of the vehicle, a pivotal connection between each lifting jack and the rear portion of the runner adjacent thereto and a bodily movable connection between each lifting jack and the forward portion of the runner adjacent thereto.

2. The combination with a motor vehicle, of front and rear wheel runners, lifting jacks pivotally mounted on the axles of the motor vehicle beyond the wheels, an operating member, connections from said member extending outwardly from the rear wheels of the vehicle and inwardly of the forward wheels thereof, said connections extending to the jacks, direct pivotal connections between each jack and the rear portion of the runner adjacent thereto, bodily movable members connecting each jack with the forward portion of the runner adjacent thereto, said bodily movable members of the forward runners being pivotally supported from the knuckles of the front wheels of the vehicle.

3. The combination with a motor vehicle, of forward sleigh runners therefor, jacks pivotally mounted on the forward vehicle axles beyond the wheels, said jacks having rearwardly-extending arms pivotally connected to the rear portions of the runners and forwardly-extending arms, links connecting the forwardly-extending arms to the forward portions of the runners, U-shaped members extending from the jacks over the wheels and swingingly connected to the knuckle joint, operating connections leading from said U-shaped members and additional U-shaped members pivotally connected to the links and to a projection from the steering knuckles of the wheels.

In testimony whereof I affix my signature.

CHARLES J. FUSSNER.